United States Patent
Zhang et al.

(10) Patent No.: US 11,098,166 B2
(45) Date of Patent: Aug. 24, 2021

(54) DEGRADABLE HYPERBRANCHED EPOXY RESIN AND PREPARATION METHOD THEREOF

(71) Applicant: South Central University for Nationalities, Hubei (CN)

(72) Inventors: Daohong Zhang, Hubei (CN); Yeyun Liang, Hubei (CN); Junheng Zhang, Hubei (CN); Juan Cheng, Hubei (CN); Aiqing Zhang, Hubei (CN)

(73) Assignee: South Central University for Nationalities, Wuhan (CN)

( * ) Notice: Subject to any disclaimer, the term of this patent is extended or adjusted under 35 U.S.C. 154(b) by 0 days.

(21) Appl. No.: 16/568,690

(22) Filed: Sep. 12, 2019

(65) Prior Publication Data

US 2020/0002481 A1    Jan. 2, 2020

Related U.S. Application Data

(63) Continuation of application No. PCT/CN2019/084159, filed on Apr. 24, 2019.

(30) Foreign Application Priority Data

Apr. 26, 2018 (CN) .......................... 201810386063.3

(51) Int. Cl.
*C08G 83/00* (2006.01)

(52) U.S. Cl.
CPC ....... *C08G 83/005* (2013.01); *C08G 2230/00* (2013.01)

(58) Field of Classification Search
None
See application file for complete search history.

(56) References Cited

U.S. PATENT DOCUMENTS

| 2007/0004902 A1 | 1/2007 | Dreyer et al. |
| 2010/0280151 A1 | 11/2010 | Nguyen et al. |

FOREIGN PATENT DOCUMENTS

| CN | 101475682 A | 7/2009 |
| CN | 101475685 A | 7/2009 |
| CN | 101591421 A | 12/2009 |
| CN | 101880374 A | 11/2010 |
| CN | 103030784 A | 4/2013 |
| CN | 103145646 A | 6/2013 |
| CN | 105440261 A | 3/2016 |
| CN | 106810674 A | 6/2017 |
| WO | WO 93/17060 A1 | 9/1993 |

OTHER PUBLICATIONS

Yu, Q., Liang, Y., Cheng, J., Chen, S., Zhang, A., Miao, M., & Zhang, D. (2017). Synthesis of a degradable high-performance epoxy-ended hyperbranched polyester. ACS omega, 2(4), 1350-1359. (Year: 2017).*
You, S., Ma, S., Dai, J., Jia, Z., Liu, X., & Zhu, J. (2017). Hexahydro-s-triazine: a trial for acid-degradable epoxy resins with high performance. ACS Sustainable Chemistry & Engineering, 5(6), 4683-4689. (Year: 2017).*
U.S. Appl. No. 16/568,831, filed Sep. 12, 2019, Zhang, Daohong et al.
Jeannette M. Garcia et al., "Recyclable, Strong Thermosets and Organogels via Paraformaldehyde Condensation with Diamines," Science, vol. 344 (6185), pp. 732-735 (May 16, 2014).

* cited by examiner

*Primary Examiner* — Megan McCulley
(74) *Attorney, Agent, or Firm* — Mei & Mark LLP; Manni Li

(57) ABSTRACT

Degradable hyperbranched epoxy resin and a preparation method thereof, wherein the preparation method comprises carrying out a reaction between a cyclotriazine compound and a carboxyl-sourced compound to prepare a carboxyl-terminated or hydroxy-terminated hyperbranched polymer; then reacting with epoxy chloropropane to obtain a degradable hyperbranched epoxy resin of which the molecular weight is about 1,900-22,000 g/mol. After the degradable hyperbranched epoxy resin is cured, a cyclotriazine structure can be completely degraded within 2 h in a phosphoric acid solution at the temperature of 80° C., thus realizing the recycle of the epoxy resin. The invention has simple process, and the product is degradable and has self-strengthening and self-toughening functions, and is expected to be used in the fields of strengthening and toughening of epoxy resins, solvent-free coatings etc.

8 Claims, No Drawings

DEGRADABLE HYPERBRANCHED EPOXY RESIN AND PREPARATION METHOD THEREOF

CROSS-REFERENCE TO RELATED APPLICATIONS

The subject application is a continuation of PCT/CN2019/084159 filed on Apr. 24, 2019, which claims priority on Chinese application no. 201810386063.3 filed on Apr. 26, 2018. The contents and subject matters of both PCT application and Chinese priority application are incorporated herein by reference.

BACKGROUND OF THE INVENTION

Technical Field

The invention relates to the technical field of hyperbranched epoxy resins and preparation methods thereof, in particular to a degradable hyperbranched epoxy resin and a preparation method thereof.

Description of Related Art

The synthesis of hyperbranched epoxy resin originated in 1993. The PCT international patent application (WO9317060) discloses the synthesis of an aliphatic sulfur-containing hyperbranched epoxy resin with higher viscosity by reacting a raw material dimethylolpropionic acid with trimethylolpropane and epichlorohydrin. The inventor of the present application (Zhang Daohong) invented a nitrogen heterocyclic hyperbranched epoxy resin and a silicon skeleton hyperbranched epoxy resin having high heat resistance temperature (ZL200910029024.9, ZL200910029026.8, ZL200910062871.5, and ZL201010224451.5). These reported preparation processes of hyperbranched epoxy resins usually require the addition of a large amount of organic solvents. After the completion of the reaction, most of the processes require a water washing step, which causes certain environmental pollution, and the reported preparation technologies of the sulfur-containing hyperbranched epoxy resin (esterification reaction, hydrosilylation reaction, grafting reaction, and group transfer polymerization reaction) have the disadvantages of low efficiency, low yield, long reaction time, high energy consumption, high curing temperature and long curing time. In view of this, the inventors of the present application invented a process technology for preparing a sulfur-containing epoxy resin (ZL201310091452.0) and a sulfur-containing hyperbranched epoxy resin (ZL201210566173.0) by a thiol-olefin click reaction, thereby improving the preparation efficiency. At present, epoxy resins and hyperbranched epoxy resins prepared by all the process technologies are of a three-dimensional network structure after being cured, and internal chemical bonds (carbon-carbon bonds and carbon-oxygen bonds) are difficult to be degraded, recycled and reused, and waste epoxy resin products are highly polluting to the environment and restrict the sustainable development technology of the epoxy resin industry. Therefore, developing a preparation technology of a degradable hyperbranched epoxy resin with simple process is the fundamental way to solve the problems existing in the field.

BRIEF SUMMARY OF THE INVENTION

Directed at the disadvantages in the prior art, an objective of the invention is to provide a novel degradable hyperbranched epoxy resin of the following structural formula:

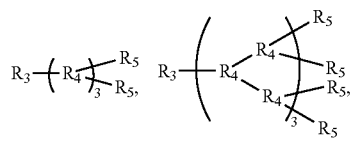

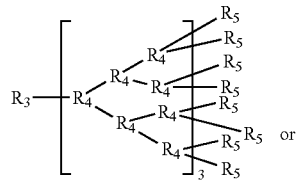

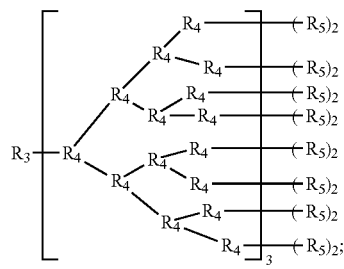

wherein the structure of $R_4$ is

and the structure of $R_5$ is

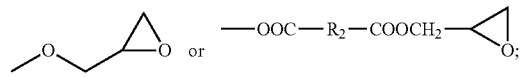

in the formula, $R_1$ is —$C_6H_4(CH_2)_r$— (in which a benzene ring is para-, meta- or ortho-substituted and is an amino substituted benzene ring structure, r=1, 2, 3 or 4) or —$CH_2$(CH$_2$)$_k$—(k=2, 3, 4 or 5);

$R_2$=—$C_6H_4$— (in which a benzene ring is para-, meta- or ortho-substituted) or $R_2$=—$CH_2(CH_2)_j$— (j=0, 1, 2, 3, 4, 5, 6, 7, 8, 9, or 10);

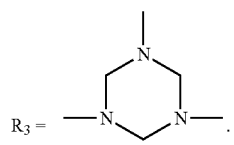

Another objective of the invention is to provide a preparation method of the degradable hyperbranched epoxy resin of the foregoing structural formula, the reaction formula of its whole process is as follows:

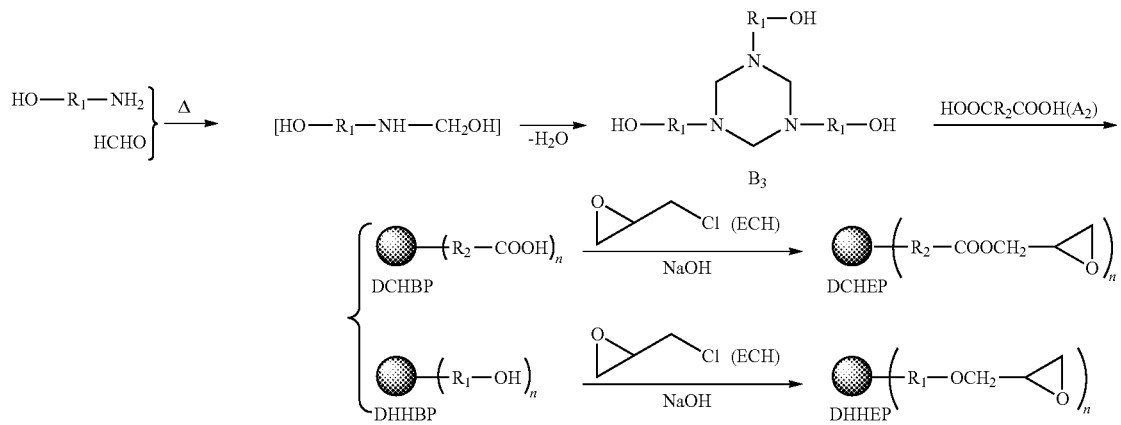

n=6, 12, 24 or 48.

In order to further explain the reaction formula of its whole process, the specific steps of the preparation method are as follows:

(a) A cyclotriazine compound, a carboxyl-sourced compound, xylene and an esterification catalyst are mixed uniformly and stirred to react at 140-200° C. for 6-12 hours, and then the xylene is vacuum-extracted at 100-120° C. to obtain a carboxyl-terminated hyperbranched polymer (DCHBP) or a hydroxyl-terminated hyperbranched polymer (DHHBP);

the carboxyl-sourced compound is a dicarboxylic acid or an acid anhydride;

the structure of the cyclotriazine compound is

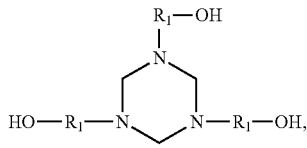

wherein $R_1$ is —$C_6H_4(CH_2)_r$— (in which a benzene ring is para-, meta- or ortho-substituted and is an amino substituted benzene ring structure, r=1, 2, 3 or 4) or —$CH_2(CH_2)_k$— (k=2, 3, 4 or 5);

the dicarboxylic acid is HOOC—$R_2$—COOH, $R_2$ is —$C_6H_4$— (in which a benzene ring is para-, meta- or ortho-substituted) or —$CH_2(CH_2)_j$— (j=0, 1, 2, 3, 4, 5, 6, 7, 8, 9, or 10);

the acid anhydride is phthalic anhydride, methyl tetrahydrophthalic anhydride, methyl hexahydrophthalic anhydride or maleic anhydride;

the molar ratio of the cyclotriazine compound to the carboxyl-sourced compound to the xylene is (0.40-1.4):1:(0.8-2.0);

the esterification catalyst is one or more of tetrabutyl titanate, zinc acetate, and tetrapropyl titanate, and the mass of the esterification catalyst is 0.5-2% of the total mass of the cyclotriazine compound and the carboxyl-sourced compound.

(b) DCHBP or DHHBP and epichlorohydrin are stirred to react at 115-130° C. for 6-8 hours in the presence of a ring opening reaction catalyst, and then the excess epichlorohydrin is vacuum-extracted, an organic solvent and a basic catalyst are added and stirred to react at −5 to 30° C. for 3-8 hours, the reaction solution is then layered and rinsed with water until neutral, and the organic solvent is distilled off, thus obtaining a hyperbranched epoxy resin DCHEP or DHHEP, i.e., a degradable hyperbranched epoxy resin.

The molar ratio of carboxyl or hydroxyl in the DCHEP or DHHEP to the epichlorohydrin to the ring opening reaction catalyst s 1:(1-10):(0.005-0.1);

the basic catalyst is sodium hydroxide and/or potassium hydroxide, and the molar ratio of the basic catalyst to the epichlorohydrin is 0.05-0.8:1.0;

the organic solvent is one or more of tetrahydrofuran, ethyl acetate, dioxane and butyl acetate, and the organic solvent is used in an amount of 0.5-1.5 times the moles of the epichlorohydrin;

the ring opening reaction catalyst is one or more of tetrabutylammonium bromide, cetyltrimethylammonium bromide, cetyltriethylammonium bromide, sodium hydroxide, and potassium hydroxide.

The obtained degradable hyperbranched epoxy resin has a molecular weight of about 1,900-22,000 g/mol.

The degradable hyperbranched epoxy resin prepared by the invention has the advantages of low viscosity and being degradable (the triazine ring can be degraded at a high temperature under an acidic condition), and is expected to be applied to the fields of environmentally-friendly adhesives, environmentally friendly low-volatile coatings, low-volatility resins, strengthening and toughening of epoxy resins, etc.

Compared with the prior art, the technical solution of the invention has the following advantages and beneficial effects:

1. The invention introduces a cyclotriazine structure into the structure of a hyperbranched epoxy resin, which can realize a degradable function after curing of the epoxy resin, and an amino compound is produced after degradation of the cyclotriazine structure, and the amino compound can be used as a curing agent for epoxy resins and the raw material for the synthesis of the cyclotriazine to realize the recycling of the epoxy resin.

2. The degradable hyperbranched epoxy resin of the invention has rapid degradation ability after being cured, and its degradation rate can reach 99.5% or above after the epoxy resin is placed in a phosphoric acid solution at 80° C. for 2 hours.

3. The degradable hyperbranched epoxy resin of the invention has the advantages of a hyperbranched polymer, has strengthening and toughening functions for ordinary epoxy resin, and thus is expected to be widely used in the field of strengthening and toughening of epoxy resins.

4. The degradable hyperbranched epoxy resin of the invention has simple preparation process and low raw material cost, and is suitable for industrial production.

5. The degradable hyperbranched epoxy resin of the invention has low viscosity, and is added to a bisphenol A epoxy resin to significantly reduce its viscosity, thus functioning as a reactive diluent; the degradable hyperbranched epoxy resin is expected to be applied to the field of solvent-free, low-volatile epoxy coatings.

DETAILED DESCRIPTION OF THE INVENTION

The invention is described in detail below with reference to specific embodiments, but these embodiments should not be construed as limiting the scope of the invention in any way.

The molecular weights of the products are determined by using GPC from British PL Company. The epoxy value is determined by the national standard hydrochloric acid acetone method, and the viscosity is measured by using a Brookfield viscometer at 25° C.

The cyclotriazine compounds B3 (i.e.,

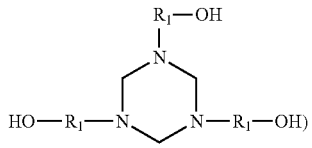

in the following embodiments are self-made by the inventors of the present application, and the specific preparation process is as follows:

Preparation of compound B3

The preparation of the cyclotriazine compound B3 is based on the reaction principle of the reference (Science 2014, 344, (6185), 732-735), and its specific process steps are as follows: 0.1 mol of p-aminobenzyl alcohol ($R_1$=—$C_6H_4CH_2$—), 0.15 mol of trioxymethylene, and 50 mL of distilled water are placed in a three-necked flask equipped with a condenser, a thermometer and a stirrer, and stirred to react for 8 hours at a temperature of about 30° C., and the reaction is then terminated. The water and unreacted formaldehyde are removed by rotary evaporation under the conditions of a vacuum degree of 2-3 mmHg and a temperature of about 60° C. to obtain a solid powder cyclotriazine denoted as B3-01, with a yield of about 82%. The remaining B3 compounds can be obtained in a similar manner with yields between 60% and 85%. The corresponding compounds are denoted as B3-02 ($R_1$=—$C_6H_4(CH_2)_2$—), B3-03($R_1$=—$C_6H_4(CH_2)_4$—), B3-04 ($R_1$=—$CH_2(CH_2)_2$—), B3-05 ($R_1$=—$CH_2(CH_2)_3$—), and B3-06 ($R_1$=—$CH_2(CH_2)_5$—).

Embodiment 1 A degradable hyperbranched epoxy resin, prepared in the following way:

(a) 0.4 mol of a cyclotriazine compound B3-01, 0.3 mol of terephthalic acid, 0.24 mol of xylene, and zinc acetate (the mass of zinc acetate is 0.5% of the total mass of B3-01 and terephthalic acid) are mixed uniformly and stirred to react at 180° C. for 10 hours, and then xylene is vacuum-extracted at 110° C. to obtain a hydroxyl-terminated hyperbranched polymer (DHHBP-006, containing 6 mol of hydroxyl per mol of DHHBP-006) having a number average molecular weight of about 2,000 g/mol.

(b) 0.01 mol of DHHBP-006, 0.06 mol of epichlorohydrin, and 0.001 mol of tetrabutylammonium bromide are added to a three-necked flask and stirred to react at about 120° C. for 7 hours, and then excess epichlorohydrin is vacuum-extracted; 0.06 mol of tetrahydrofuran and 0.012 mol of sodium hydroxide are added and stirred to react at −5 to 0° C. for 8 hours; the reaction solution is then layered and rinsed with water until neutral; and the organic solvent is distilled off to obtain a hyperbranched epoxy resin (DHHEP-006) with a number average molecular weight of about 2,300 g/mol, a viscosity of 2,300 cp, and an epoxy value of 0.21 mol/100 g.

Embodiment 2 A degradable hyperbranched epoxy resin, prepared in the following way:

(a) 0.46 mol of a cyclotriazine compound B3-02, 0.45 mol of phthalic anhydride, 0.90 mol of xylene, and tetrapropyl titanate (the mass of tetrapropyl titanate is 1.0% of the total mass of B3-02 and phthalic anhydride) are mixed uniformly and stirred to react at 140° C. for 12 hours, and then xylene is vacuum-extracted at 100° C. to obtain a hydroxyl-terminated hyperbranched polymer (DHHBP-048, containing 48 mol of hydroxyl per mol of DHHBP-048) having a number average molecular weight of about 18,600 g/mol.

(b) 0.01 mol of DHHBP-048, 1.92 mol of epichlorohydrin, and 0.0024 mol of cetyltriethylammonium bromide are added to a three-necked flask and stirred to react at about 130° C. for 6 hours, and then excess epichlorohydrin is vacuum-extracted; 0.96 mol of ethyl acetate and 0.096 mol of potassium hydroxide are added and stirred to react at 5-10° C. for 5 hours; the reaction solution is then layered and rinsed with water until neutral; and the organic solvent is distilled off to obtain a hyperbranched epoxy resin (DHHEP-048) with a number average molecular weight of about 21,200 g/mol, a viscosity of 5,200 cp, and an epoxy value of 0.19 mol/100 g.

Embodiment 3 A degradable hyperbranched epoxy resin, prepared in the following way:

(a) 0.10 mol of a cyclotriazine compound B3-03, 0.09 mol of adipic acid, 0.126 mol of xylene, and tetrabutyl titanate (the mass of tetrabutyl titanate is 2.0% of the total mass of B3-03 and adipic acid) are mixed uniformly and stirred to react at 200° C. for 6 hours, and then xylene is vacuum-extracted at 120° C. to obtain a hydroxyl-terminated hyperbranched polymer (DHHBP-012, containing 12 mol of hydroxyl per mol of DHHBP-012) having a number average molecular weight of about 5,100 g/mol.

(b) 0.01 mol of DHHBP-012, 1.2 mol of epichlorohydrin, and 0.006 mol of cetyltrimethylammonium bromide are added to a three-necked flask and stirred to react at about 115° C. for 8 hours, and then excess epichlorohydrin is vacuum-extracted; 1.8 mol of dioxane and 0.96 mol of sodium hydroxide are added and stirred to react at 20-30° C. for 3 hours; the reaction solution is then layered and rinsed with water until neutral; and the organic solvent is distilled off to obtain a hyperbranched epoxy resin (DHHEP-012) with a number average molecular weight of about 5,700 g/mol, a viscosity of 1,600 cp, and an epoxy value of 0.20 mol/100 g.

Embodiment 4 A degradable hyperbranched epoxy resin, prepared in the following way:

(a) 0.04 mol of a cyclotriazine compound B3-04, 0.09 mol of malonic acid, 0.1 mol of xylene, and tetrabutyl titanate (the mass of tetrabutyl titanate is 1.5% of the total mass of B3-04 and malonic acid) are mixed uniformly and stirred to react at 160° C. for 9 hours, and then xylene is vacuum-extracted at 120° C. to obtain a carboxyl-terminated hyperbranched polymer (DCHBP-06, containing 6 mol of carboxyl per mol of DCHBP-06) having a number average molecular weight of about 1,600 g/mol.

(b) 0.01 mol of DCHBP-06, 0.5 mol of epichlorohydrin, and 0.003 mol of cetyltrimethylammonium bromide are added to a three-necked flask and stirred to react at about 125° C. for 7 hours, and then excess epichlorohydrin is vacuum-extracted; 0.2 mol of dioxane, 0.3 mol of butyl acetate and 0.3 mol of sodium hydroxide are added and stirred to react at 10-20° C. for 6 hours; the reaction solution is then layered and rinsed with water until neutral; and the organic solvent is distilled off to obtain a hyperbranched epoxy resin (DCHEP-06) with a number average molecular weight of about 1,900 g/mol, a viscosity of 1,200 cp, and an epoxy value of 0.23 mol/100 g.

Embodiment 5 A degradable hyperbranched epoxy resin, prepared in the following way:

(a) 0.10 mol of a cyclotriazine compound B3-05, 0.21 mol of azelaic acid, 0.3 mol of xylene, and zinc acetate (the mass of zinc acetate is 1.2% of the total mass of B3-05 and azelaic acid) are mixed uniformly and stirred to react at 190° C. for 8 hours, and then xylene is vacuum-extracted at 120° C. to obtain a carboxyl-terminated hyperbranched polymer (DCHBP-12, containing 12 mol of carboxyl per mol of DCHBP-12) having a number average molecular weight of about 6,200 g/mol.

(b) 0.01 mol of DCHBP-12, 0.8 mol of epichlorohydrin, and 0.01 mol of tetrabutylammonium bromide are added to a three-necked flask and stirred to react at about 120° C. for 6 hours, and then excess epichlorohydrin is vacuum-extracted; 0.4 mol of ethyl acetate, 0.4 mol of butyl acetate and 0.4 mol of sodium hydroxide are added and stirred to react at 5-10° C. for 7 hours; the reaction solution is then layered and rinsed with water until neutral; and the organic solvent is distilled off to obtain a hyperbranched epoxy resin (DCHEP-12) with a number average molecular weight of about 6,800 g/mol, a viscosity of 1,000 cp, and an epoxy value of 0.17 mol/100 g.

Embodiment 6 A degradable hyperbranched epoxy resin, prepared in the following way:

(a) 0.22 mol of a cyclotriazine compound B3-06, 0.45 mol of adipic acid, 0.5 mol of xylene, and zinc acetate (the mass of zinc acetate is 1.5% of the total mass of B3-06 and adipic acid) are mixed uniformly and stirred to react at 190° C. for 10 hours, and then xylene is vacuum-extracted at 120° C. to obtain a carboxyl-terminated hyperbranched polymer (DCHBP-024, containing 24 mol of carboxyl per mol of DCHBP-024) having a number average molecular weight of about 17,000 g/mol.

(b) 0.01 mol of DCHBP-024, 1.2 mol of epichlorohydrin, and 0.01 mol of potassium hydroxide are added to a three-necked flask and stirred to react at about 125° C. for 8 hours, and then excess epichlorohydrin is vacuum-extracted; 1.0 mol of dioxane and 0.6 mol of potassium hydroxide are added and stirred to react at 10-20° C. for 6 hours; the reaction solution is then layered and rinsed with water until neutral; and the organic solvent is distilled off to obtain a hyperbranched epoxy resin (DCHEP-024) with a number average molecular weight of about 18,300 g/mol, a viscosity of 1,400 cp, and an epoxy value of 0.12 mol/100 g.

A curing agent 4,4-diaminodiphenylmethane is respectively uniformly mixed with each of the degradable hyperbranched epoxy resins obtained in Embodiments 1-6 and a bisphenol A epoxy resin (E51, having an epoxy value of 0.51 mol/100 g) in the same way under the condition of an equimolar ratio of the hydrogen equivalent of the curing agent to the epoxy value of the hyperbranched epoxy resin, and then the mixture is cured into a film, and specifically, the mixture is first cured for 6 hours at 80-90° C., and then heated to 150-160° C. and cured for 4 hours. The pencil hardness and wear resistance of the film are tested according to the national standards GB/T6739-1996 and GB/T1768-2006, and the properties are shown in Table 1. 0.5 g of the above cured film is ground into a powder, and then degraded by 12 mL of a 0.5 mol/L aqueous phosphoric acid solution. After being stirred at 80° C. for 2 hours, the solution is filtered, and the filter cake is dried for 2 hours at 120° C. The degradation rate of the cured powder is then analyzed and the data is shown in Table 1.

Degradation rate (%) =(1−mass of the dried filter cake/ mass of cured powder)*100%;

TABLE 1

Properties of Degradable Hyperbranched Epoxy Resin Products Prepared in Embodiments 1-6

| Resin type | Pencil hardness | Wear resistance (mg/1000 rpm) | Degradation rate (%) |
|---|---|---|---|
| Epoxy resin E51 | 4H | 17.36 | 1.2 |
| Embodiment 1 | 4H | 12.53 | 99.6 |
| Embodiment 2 | 4H | 10.92 | 99.5 |
| Embodiment 3 | 4H | 9.85 | 99.6 |
| Embodiment 4 | 4H | 9.34 | 99.7 |
| Embodiment 5 | 4H | 10.89 | 99.6 |
| Embodiment 6 | 3H | 16.95 | 99.5 |

What is claimed is:

1. A degradable hyperbranched epoxy resin, having a structural formula that is

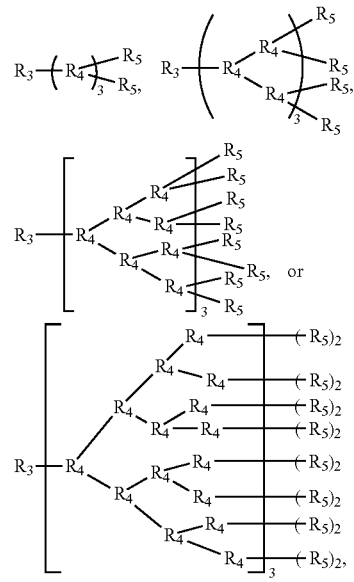

wherein $R_4$ is

$R_5$ is

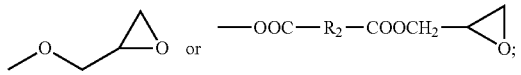

$R_1$ is —$C_6H_4(CH_2)_r$— or —$CH_2(CH_2)_k$—, r=1, 2, 3 or 4, k=2, 3, 4 or 5, and a benzene ring in the —$C_6H_4(CH_2)_r$— is para-, meta- or ortho-substituted and is optionally an amino substituted benzene ring structure;

$R_2$ is —$C_6H_4$— or —$CH_2(CH_2)_j$—, j is 0, 1, 2, 3, 4, 5, 6, 7, 8, 9, or 10;

a benzene ring in the —$C_6H_4$— is para-, meta- or ortho-substituted; and $R_3$ is

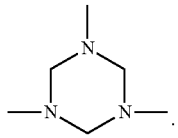

2. A method for preparing a degradable hyperbranched epoxy resin, comprising:
  mixing a cyclotriazine compound, a carboxyl-sourced compound, xylene, and an esterification catalyst uniformly,
  stirring for reaction at 140-200° C. for 6-12 hours,
  vacuum-extracting the xylene at 100-120° C. to obtain a carboxyl-terminated or hydroxyl-terminated hyperbranched polymer, wherein the carboxyl-sourced compound is a dicarboxylic acid or an acid anhydride;
  the cyclotriazine compound is

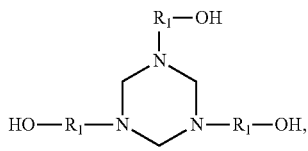

$R_1$ is —$C_6H_4(CH_2)_r$— or —$CH_2(CH_2)_k$—, r=1, 2, 3 or 4, k=2, 3, 4 or 5, and a benzene ring in the —$C_6H_4(CH_2)_r$— is para-, meta- or ortho-substituted and is optionally an amino substituted benzene ring structure;

the dicarboxylic acid is HOOC—$R_2$—COOH, $R_2$ is —$C_6H_4$— or —$CH_2(CH_2)_j$—, j=0, 1, 2, 3, 4, 5, 6, 7, 8, 9, or 10;

a benzene ring in the —$C_6H_4$— is para-, meta- or ortho-substituted;

the acid anhydride is phthalic anhydride, methyl tetrahydrophthalic anhydride, methyl hexahydrophthalic anhydride or maleic anhydride; and stirring the carboxyl-terminated or hydroxyl-terminated hyperbranched polymer and epichlorohydrin to react at 115-130° C. for 6-8 hours in the presence of a ring opening reaction catalyst, and then vacuum-extracting the excess epichlorohydrin, adding an organic solvent and a basic catalyst, stirring to reaction at −5 to 30° C. for 3-8 hours, then layering, washing with water until neutral, and distilling off the organic solvent, thus obtaining a degradable hyperbranched epoxy resin of which the molecular weight is about 1,900-22,000 g/mol, wherein the ring opening reaction catalyst is one or more of tetrabutylammonium bromide, cetyltrimethylammonium bromide, cetyltriethylammonium bromide, sodium hydroxide and potassium hydroxide.

3. The method according to claim 2, wherein the molar ratio of the cyclotriazine compound to the carboxyl-sourced compound to the xylene in the step (a) is (0.40-1.4):1:(0.8-2.0).

4. The method according to claim 2, wherein the esterification catalyst in the step (a) is one or more of tetrabutyl titanate, zinc acetate, and tetrapropyl titanate.

5. The method according to claim 4, wherein the mass of the esterification catalyst is 0.5-2% of the total mass of the cyclotriazine compound and the carboxyl-sourced compound.

6. The method according to claim 2, wherein the molar ratio of carboxyl or hydroxyl in the carboxyl-terminated or hydroxyl-terminated hyperbranched polymer to the epichlorohydrin to the ring opening reaction catalyst in the step (b) is 1:(1-10):(0.005-0.1).

7. The method according to claim 2, wherein the basic catalyst in the step (b) is sodium hydroxide and/or potassium hydroxide, and the molar ratio of the basic catalyst to the epichlorohydrin is 0.05-0.8:1.0.

8. The method according to claim 2, wherein the organic solvent in the step (b) is one or more of tetrahydrofuran, ethyl acetate, dioxane and butyl acetate, and the organic solvent is used in an amount of 0.5-1.5 times the moles of the epichlorohydrin.

* * * * *